United States Patent [19]

Lee et al.

[11] Patent Number: 5,574,676
[45] Date of Patent: Nov. 12, 1996

[54] INTEGER MULTIPLY INSTRUCTIONS INCORPORATING A SUBRESULT SELECTION OPTION

[75] Inventors: Ruby B. Lee, Los Altos, Calif.; Charles R. Dowdell; Joel D. Lamb, both of Fort Collins, Colo.

[73] Assignee: Hewlett-Packard Company, Palo Alto, Calif.

[21] Appl. No.: 300,278

[22] Filed: Sep. 2, 1994

[51] Int. Cl.⁶ ...................................................... G06F 7/52
[52] U.S. Cl. .......................................... 364/745; 364/760
[58] Field of Search ........................... 395/375; 364/745, 364/757, 760

[56] References Cited

U.S. PATENT DOCUMENTS

| 4,346,437 | 8/1982 | Blahut et al. | 395/375 |
| 5,260,889 | 11/1993 | Palaniswani | 364/745 |
| 5,426,599 | 6/1995 | Machida | 364/760 |

OTHER PUBLICATIONS

Odnert et al., "Architecture and Compiler Enhancements for PA–RISC Workstations", 1991 IEEE.
Hennessy et al., "Computer Architecture A Quantitative Approach", pp. 141, 159, 1990.
James, "Multiplexed Buses: The Indian Wars continue" 1990 IEEE.

*Primary Examiner*—Krisna Lim
*Assistant Examiner*—Kenneth R. Coulter

[57] ABSTRACT

A computer instruction and apparatus for performing a N-bit by N-bit multiplication and having the ability to select a part of the multiplication result for storage into a result register N-bits wide. A first embodiment of the invention allows a sequence of n-bits from the N-bit by N-bit multiply result to be stored into an N-bit wide register. N+1 to 1 multiplexors are utilized to select which of the multiply result bits are stored into the result register in response to a multiply and select computer instruction. The second preferred embodiment utilizes multiplexors having fewer than N+1 inputs to select discrete subsets of the multiply result bits for storage into the N-bit wide result register. In this manner, less complex multiplexors are required which take less chip area to implement. The third preferred embodiment utilizes multiple sets of multiplexors to select multiple subresults generated by a parallel multiplication operation. The multiple subresults are stored in a single result register. By allowing subresults to be selected and stored as part of the multiply operation, a multiply apparatus according to the present invention is more time and instruction efficient than prior art devices.

9 Claims, 8 Drawing Sheets

(PRIOR ART)

FIG 8

INTEGER MULTIPLY INSTRUCTIONS INCORPORATING A SUBRESULT SELECTION OPTION

FIELD OF THE INVENTION

The present invention relates to the implementation and design of specialized multiply instructions for use in digital computer processors.

BACKGROUND OF THE INVENTION

Figure 1:
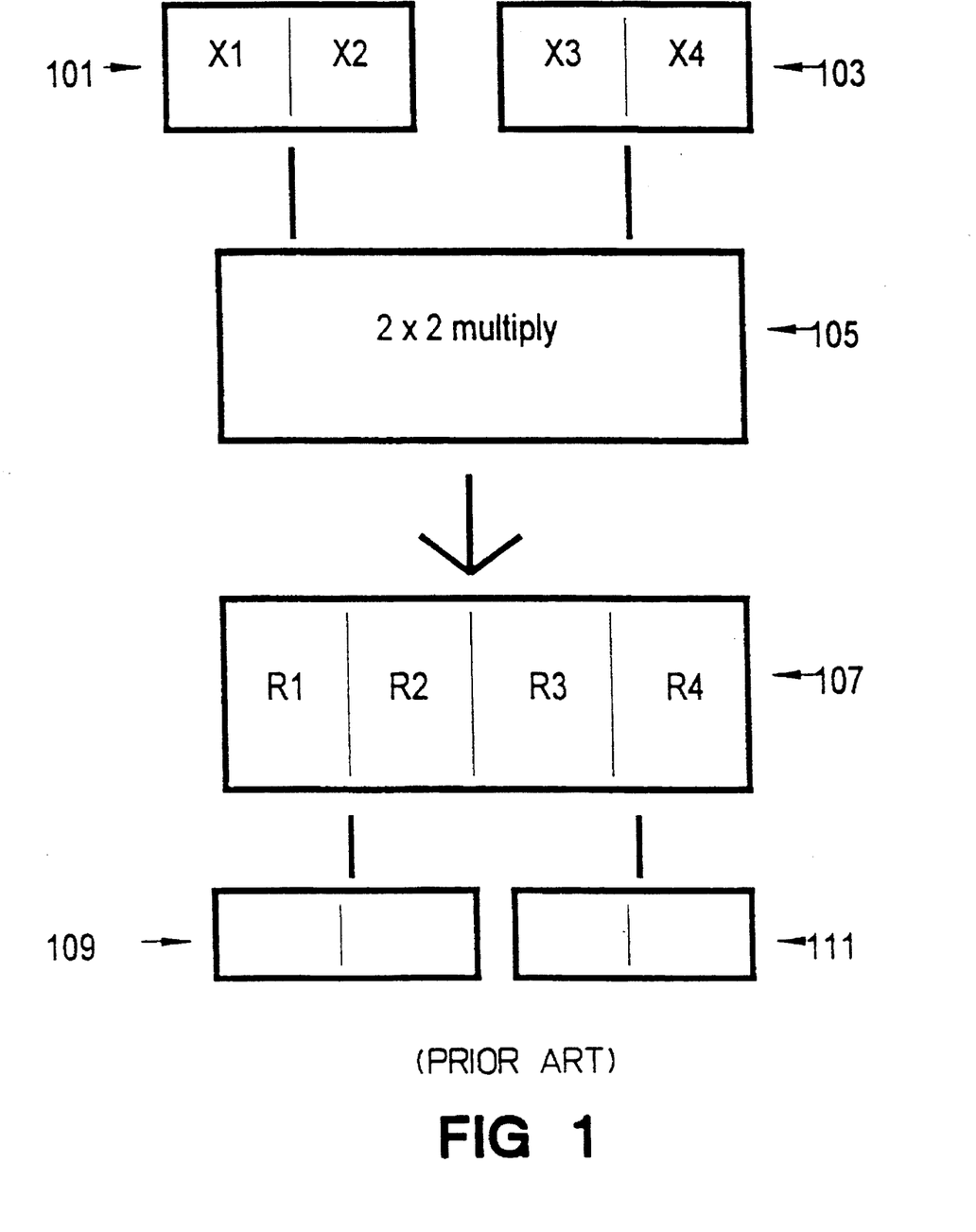
FIG. 1 is a simplified illustration of a 2-bit×2-bit multiply operation yielding a 4-bit result.

Typical computer integer or fixed-point multiply instructions are implemented such that an associated computer will take two operands each N-bits wide and multiply them together to produce a result 2N-bits wide. Being 2N bits wide, the result needs to be stored, typically, in two separate registers each N-bits wide. To get both N-bit portions of the result, typically two separate instructions need to be executed by the computer. The first instruction stores the high N-bits of the result in a first register and the second instruction stores the low n-bits of the result in a second register with both the first and second registers being N-bits wide. FIG. 1 illustrates the multiply process where two 2-bit operands 101 and 103 are multiplied together by a multiplier 105 to produce a 4-bit result 107. The result 107 is then stored in two 2-bit registers 109 and 111 where register 109 holds bits R1–R2 and register 111 holds bits R3–R4.

In many applications the entire 2N-bit result is not required but instead a subset of the 2N-bits is of interest. If this is just the low or high N-bits, then one instruction suffices. However, an application may require the middle N-bits of the result of a multiply operation. To position the middle resultant N-bits (a subresult) into a single N-bit register requires multiple multiply and post multiply operations.

The present invention is a computer instruction and apparatus that provides for an improved way to align a subresult of a multiply instruction such that the subresult is stored into a single computer register without requiring post multiply operations.

SUMMARY OF THE INVENTION

In accordance with a first preferred embodiment of the present invention, a computer system is presented which facilitates the efficient alignment of multiplication subresults into a single register. Preferably, the desired subresult is selected by control circuitry, which directs a plurality of multiplexors to cause the desired subresult to be placed into a result register. There are "N", N+1 to 1, multiplexors. Each multiplexor controls a single unique bit position in the result register and controls which of a subset of resultant bits is directed into that unique position. The control circuitry decodes a computer instruction and, based on the value in a select field, directs the multiplexors to select the appropriate subresult bits to be stored in the result register.

For example, if N=8 (an 8-bit by 8-bit multiply), then eight multiplexors each having nine inputs would be utilized to store a subresult into an 8-bit result register. In this way any subresult, consisting of a contiguous sequence of 8-bits, is selectable for storage in the result register. A particular subresult is selected based on the value in the select field of the multiply instruction. This process requires no post multiply alignment operations and is therefore very time efficient.

In a second preferred embodiment of the present invention, control circuitry selects one of a discrete number of subresults to be stored in a result register where the number of discrete subresults is less than N+1. As such, the multiplexors are less complex (have fewer inputs) than required in the first preferred embodiment. The value in the multiply instruction select field determines which subresult is selected.

For example, if N=8, generating a multiplication intermediate result having 16-bits (1-16), and the subresult selection was between the subresults with starting bits 1, 5 and 9, then eight multiplexors each having three inputs would be utilized to store one of the three subresults into the 8-bit result register. One of the three subresults (1, 5 and 9) is selected based on the value in the select field of the multiply instruction. Because less complex multiplexors are required, this second embodiment is easier to implement in a microprocessor where chip silicon area needs to be optimally used.

In a third preferred embodiment, a value in a select field of the multiply instruction causes a subresult selection circuit to select two subresults from two intermediate results. The intermediate results are generated from a parallel multiplication operation where two pairs of operands packed in two operand registers are multiplied together. The two subresults are placed into a single result register such that the result register holds two discrete final results.

The present invention affords significant performance benefits for operations performed by a computing system which requires a selection of multiplication subresults into a single computer register over what is available with prior art systems.

DETAILED DESCRIPTION OF THE INVENTION

In the following description, reference numerals will be used to refer to specific features in the accompanying drawings. The first digit of a three digit reference number indicates the first drawing where that particular feature was discussed. For example, reference number 101 refers to a feature in FIG. 1.

Figure 2:
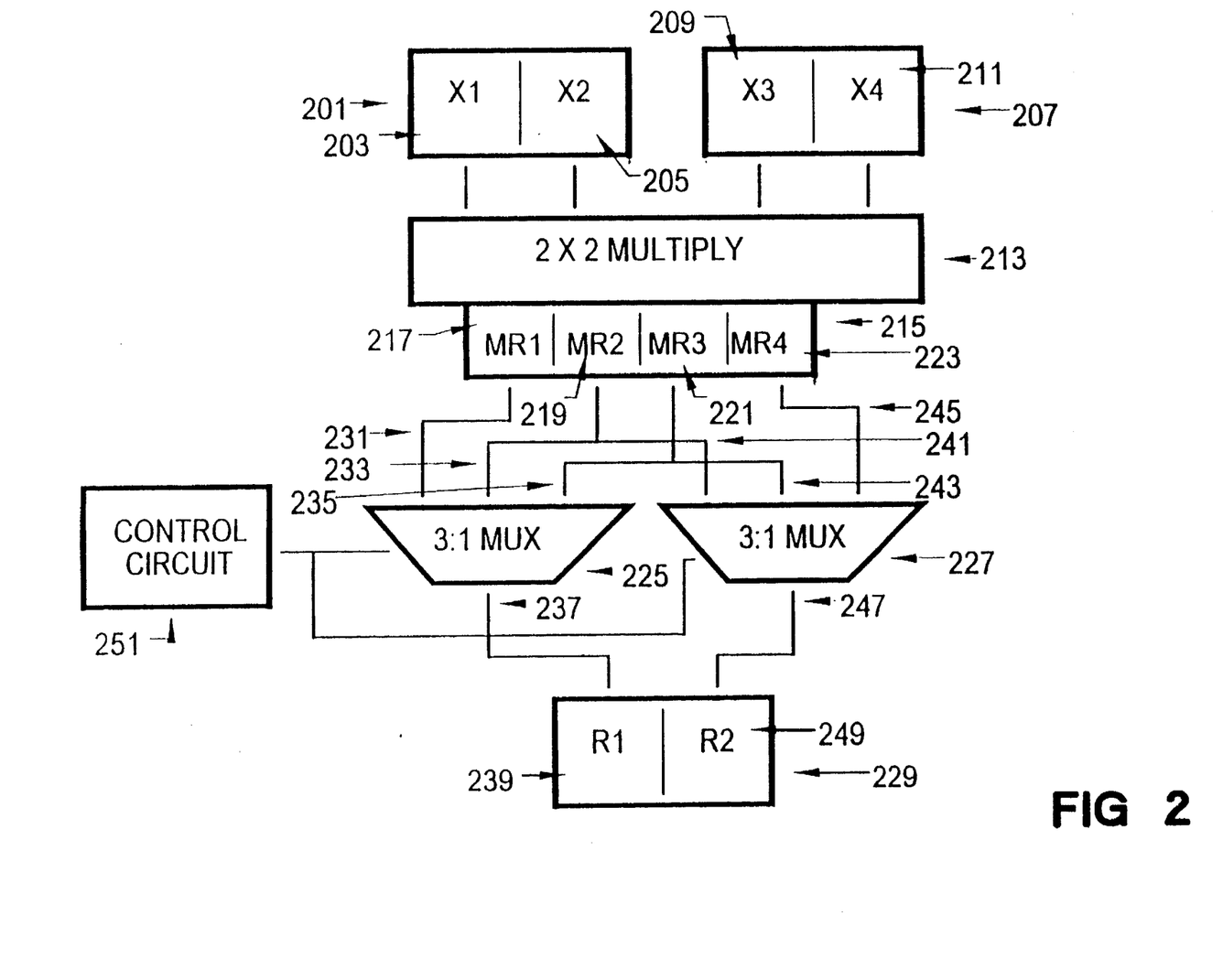
FIG. 2 illustrates a 2-bit by 2-bit multiplication apparatus according to a first preferred embodiment of the present invention.

In a first preferred embodiment of the present invention, multiple multiplexors are utilized to select a particular subresult of a multiplication operation performed by a computer. FIG. 2 illustrates the first preferred embodiment as it is implemented in a 2-bit by 2-bit multiplication operation. A first operand 201 includes bits "X1" 203 and "X2" 205. A second operand 207 includes bits "X3" 209 and "X4" 211. These two operands 201 and 207 are multiplied together by a hardware multiplier 213 as is well known in the art. The multiplication operation produces a 4-bit multiplication result 215. The four bits are "MR1" 217, "MR2" 219, "MR3" 221 and "MR4" 223.

From the 4-bit multiplication result three 2-bit subresults are possible. The three possible subresults are (MR1–MR2), (MR2–MR3) and (MR3–MR4). Two three inputs to one output (3:1) multiplexors 225 and 227 are provided to select which of the three possible subresults is stored into a 2-bit result register 229.

Multiplexor 225 has three inputs 231, 233 and 235 connected to bits "MR1", "MR2" and "MR3" respectively. The output 237 of multiplexor 225 controls bit position "R1" 239 in the result register 229. By this arrangement, multiplexor 225 selects which of bits MR1, MR2 or MR3 is stored into bit position R1 in the result register 229.

In like manner multiplexor 227 has three inputs 241, 243 and 245 connected to bits MR2, MR3 and MR4 respectively. The output 247 of multiplexor 227 controls bit position "R2" 249 in the result register 229. This arrangement enables multiplexor 227 to select which of bits MR2, MR3 or MR4 is stored into bit position R2 in the result register 229.

A control circuit 251 causes the two multiplexors 225 and 227 to select the appropriate subresult to be stored into result register 229 in response to a computer instruction. In particular, the subresult selection is in response to a value in a select field in the computer instruction. For example, if subresult MR2–MR3 is to be stored into the result register 229, then the control circuitry will control multiplexor 225 to select bit MR2 for storage into bit position R1. In like manner, the control circuitry will control multiplexor 227 to select bit MR3 for storage into bit position R2. The select field in this case would have a value associated with the selection of the second subresult. For example, the select field would have a value of "2" indicating the second subresult is to be selected.

Figure 3:
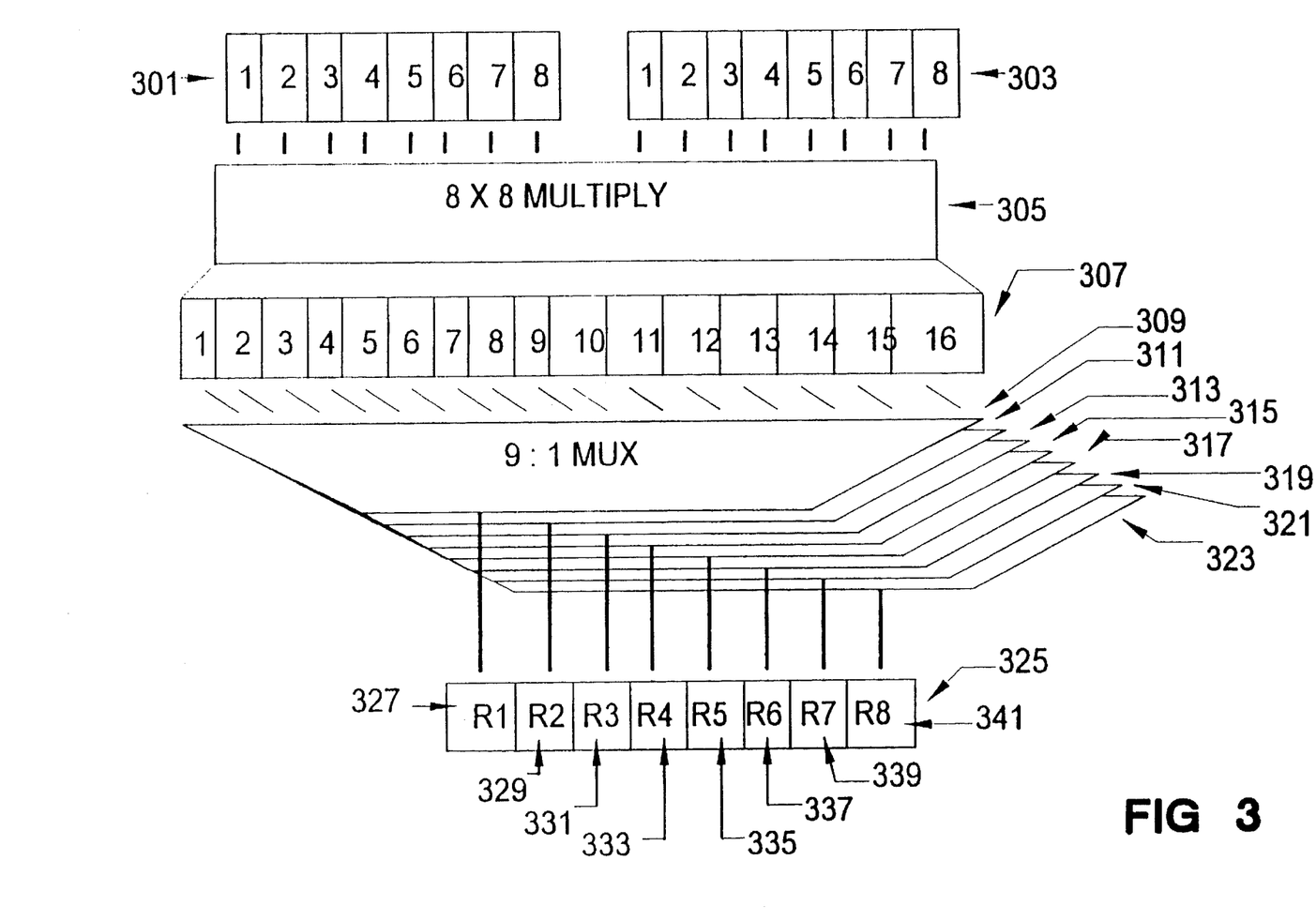
FIG. 3 illustrates an 8-bit by 8-bit multiplication apparatus according to the first preferred embodiment of the present invention.

FIG. 3 illustrates the present invention as applied to an 8-bit by 8-bit multiplication apparatus. As illustrated, two 8-bit operands 301 and 303 are multiplied together by a multiplier 305 thereby generating a 16-bit intermediate result 307. Eight 9-input to 1 output (9:1) multiplexors 309–323 select eight of the 16-bits 307 for storage into an 8-bit register 325. Each of the multiplexors 309–323 controls a unique bit position "R1"–"R8", 327–341 respectively, in the result register 325.

The nine inputs of the multiplexors 309–323 are connected to nine of the intermediate bits where multiplexor 309 is connected to bits 1–9, multiplexor 311 is connected to bits 2–10 and so on with multiplexor 323 being connected to bits 8–16 of the intermediate result 307. Control circuitry (not shown) controls which eight bits of the intermediate result the multiplexors store in the result register 325 in response to a computer instruction. In this manner any subresult (1–8), (2–9), . . . , (9–16) can be stored in the result register. As with the previous example, the value in a select field in the computer multiply instruction determines which subresult is selected.

As is understood by one skilled in the art, while each of the 9:1 multiplexors are illustrated as a single discrete multiplexor, each multiplexor may in practice consist of a number of smaller, simpler, multiplexors connected together to achieve the 9:1 multiplex function.

While the first preferred embodiment of the present invention affords great flexibility in subresult selection, such flexibility is not always needed. For example, often only a discrete number of subresults are of interest where the interesting subresults are separated by 4-bits (subresults 1–8, 5–12 etc). Therefore some flexibility can be sacrificed, and increased design compactness achieved, by using multiplexors having fewer inputs. In the second preferred embodiment of the present invention simplified multiplexors are utilized to select discrete subresults.

Figure 4:
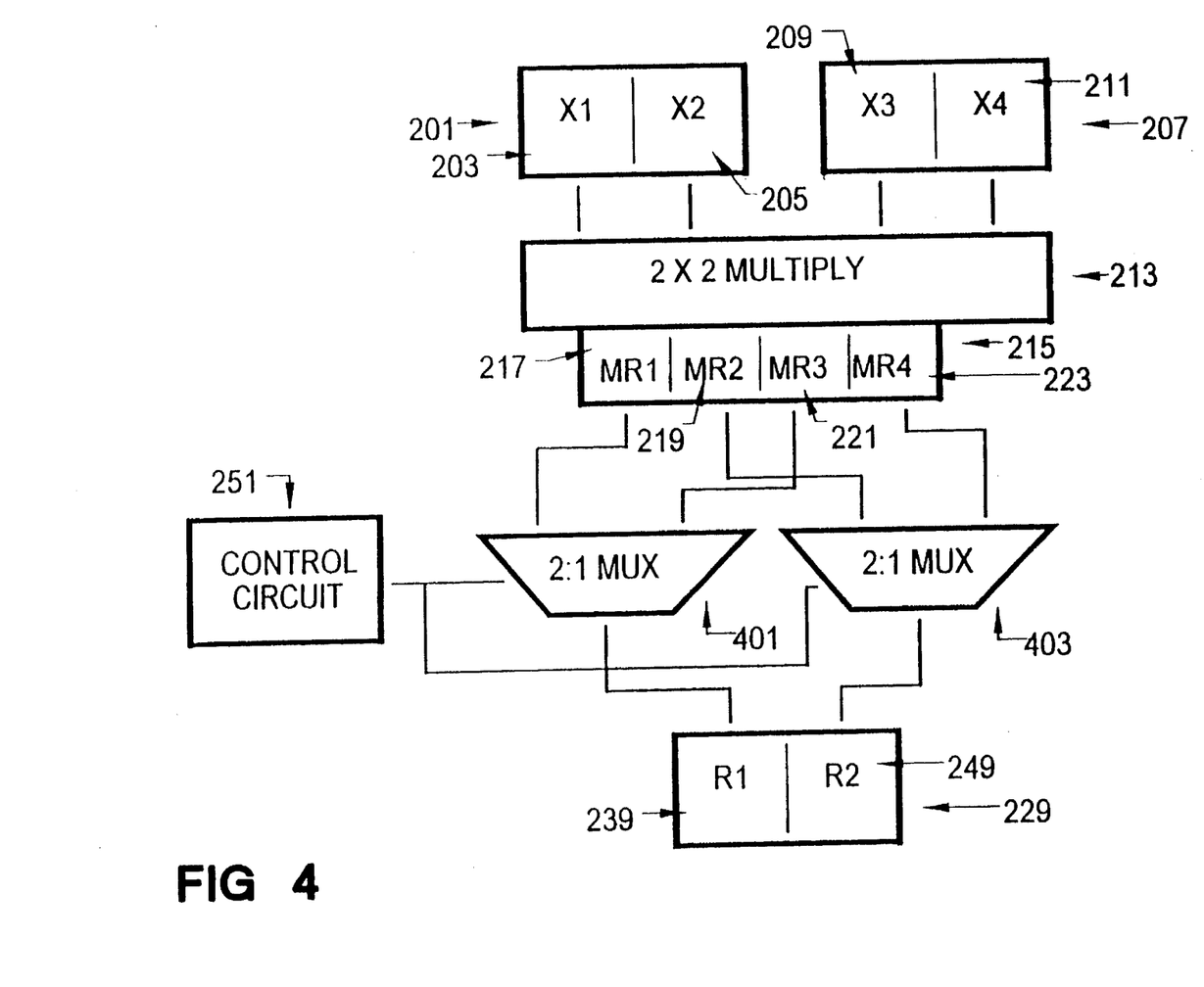
FIG. 4 illustrates a 2-bit by 2-bit multiplication apparatus according to a second preferred embodiment of the present invention.

FIG. 4 illustrates the second preferred embodiment of the invention applied to a 2-bit by 2-bit multiplication. The operation of this multiplier and selection apparatus is as described in association with FIG. 2 with the exception of the two 2:1 bit multiplexors 401 and 403 being utilized instead of the 3:1 bit multiplexors in FIG. 2. Multiplexor 401 selects either bit "MR1" 217 or bit "MR3" 221 for storage into the result register 229 bit position "R1" 239. As before, a control circuit 251, in response to a value in a select field of the associated multiply instruction, causes the multiplexors 401 and 403 to select a particular subresult.

Therefore, either subresult (MR1–MR2) or subresult (MR3–MR4) can be selected by the multiplexors for storage into the result register 229. Since two input multiplexors take less chip real estate than three input multiplexors, it is easier to design a microprocessor to utilize this advantageous apparatus than the apparatus described in association with the first preferred embodiment. However, this design simplicity is achieved at the cost of flexibility.

Figure 5:
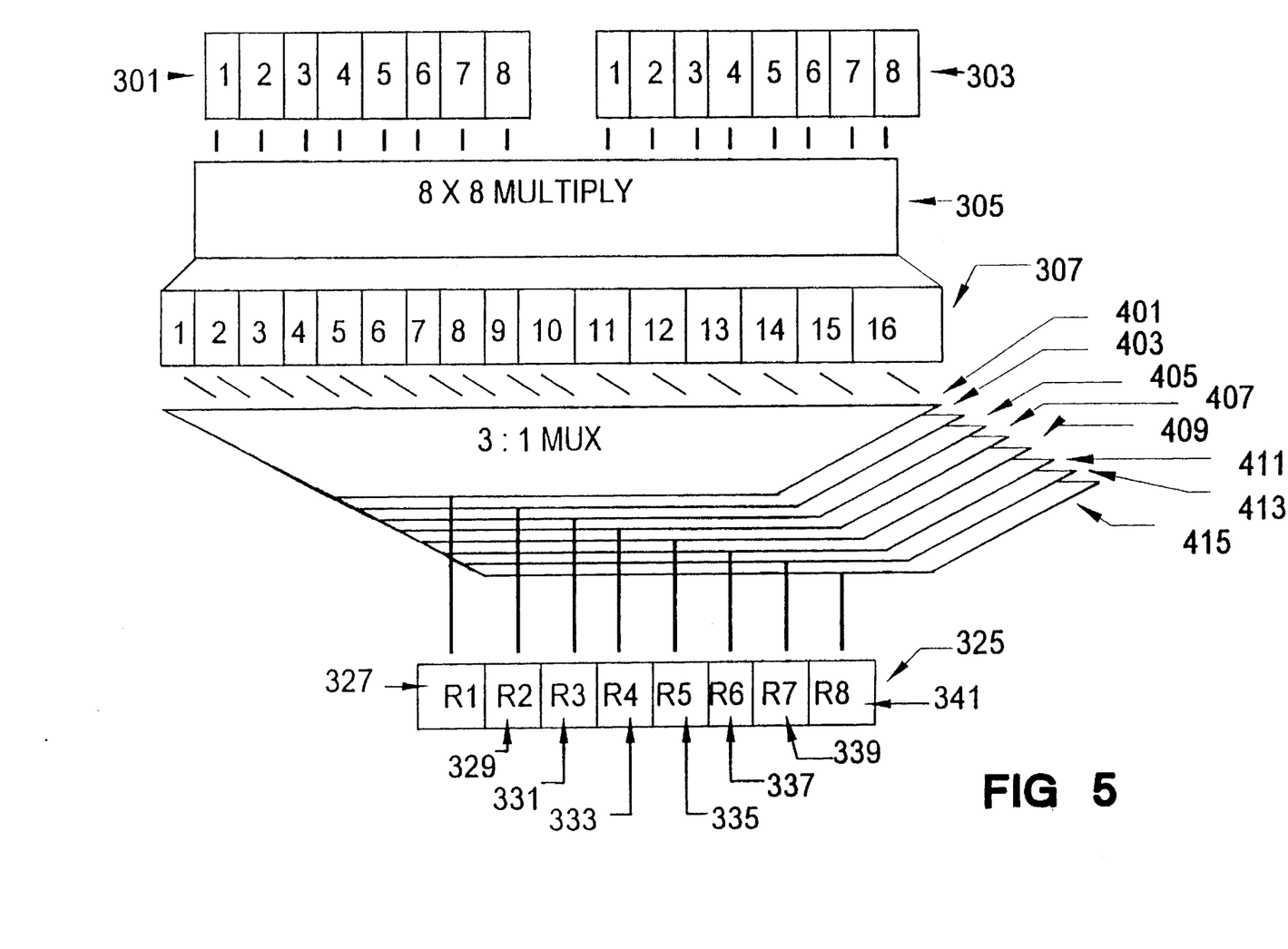
FIG. 5 illustrates an 8-bit by 8-bit multiplication apparatus according to the second preferred embodiment of the present invention.

FIG. 5 illustrates the second preferred embodiment of the present invention as applied to a 8-bit by 8-bit multiplication. The operation of the apparatus is essentially the same as described in association with FIG. 3 except that three input to one output multiplexors 401–415 replace the 9:1 multiplexors previously described. Each multiplexor is connected to three bits of the intermediate result 307 with multiplexor 401 being connected to bits (1,5 and 9), multiplexor 403 being connected to bits (2, 6 and 10), . . . , and finally with multiplexor 415 being connected to bits (8, 12 and 16).

Therefore the multiplexors can select every fourth subresult (1–8, 5–12 and 9–16) to be stored in the result register 325 in response to control circuitry (not shown). Of course any other set of subresults can be selected by controlling which intermediate result bits are connected to which multiplexors. Also a larger number of subresults can be selected by increasing the complexity of the multiplexors as is understood by those skilled in the art.

Figure 6:
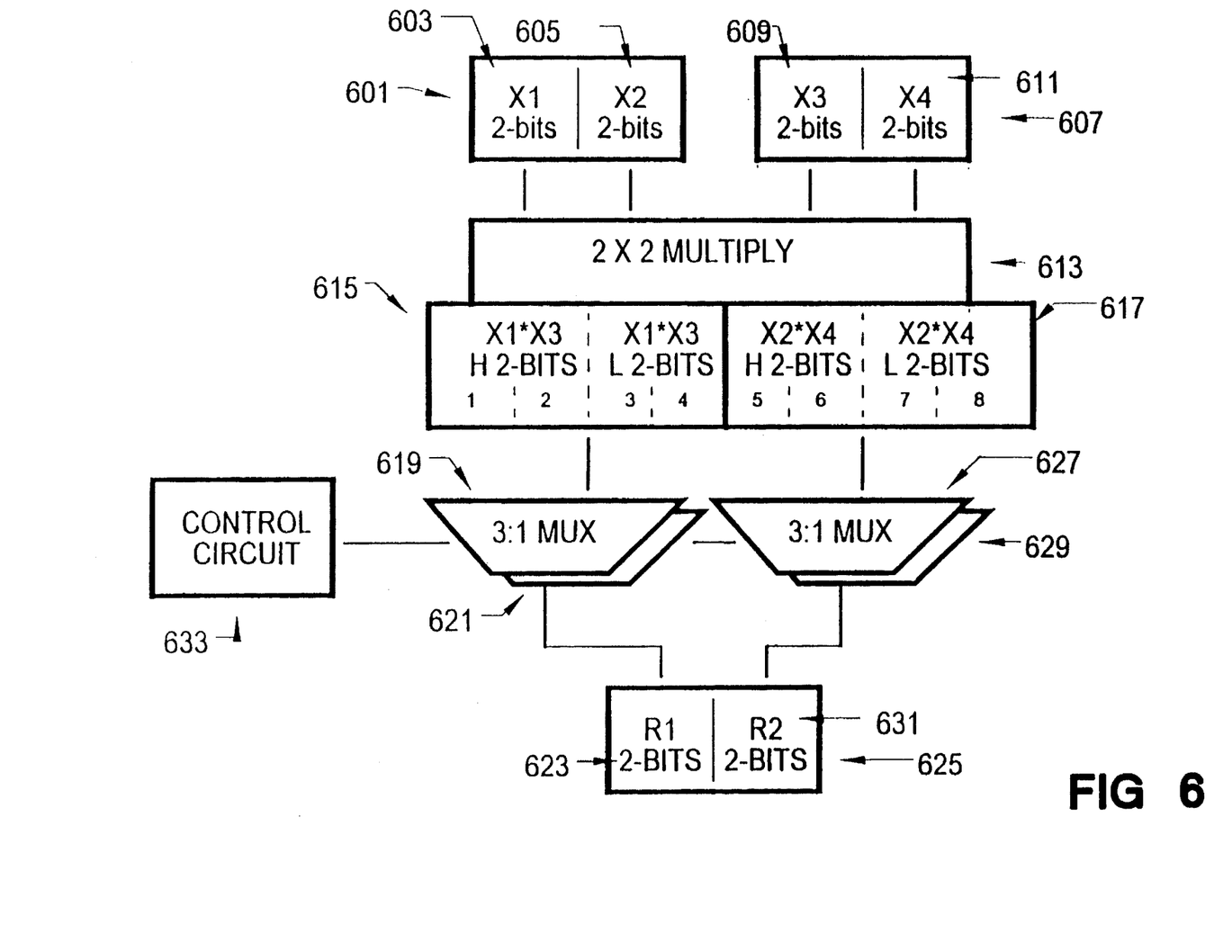
FIG. 6 illustrates a parallel multiply operation for four operands contained in two operand registers.

In a third preferred embodiment of the invention, multiplication subresult selection is applied to parallel multiplication. As illustrated in FIG. 6, a first 4-bit operand register 601 is divided into two fields 603 and 605. Field 603 contains a 2-bit operand "X1" and field 605 contains a 2-bit operand "X2". A second 4-bit operand 607 contains two 2-bit operands "X3" 609 and "X4" 611. A multiplier 613 performs two 2-bit by 2-bit multiplication operations thereby producing two 4-bit intermediate results 615 and 617. The first 4-bit intermediate result 615 is produced by multiplying operands X1 and X3 together. In like manner, the second intermediate result 617 is produced by multiplying operands X2 and X4 together. The 4-bit intermediate results 615 and 617 consist of two high and two low bits.

A pair of 3:1 multiplexors 619 and 621 select which two of the four bits (a subresult) of the first intermediate result 615 are placed into a first field 623 in a 4-bit result register 625. Likewise, two 3:1 multiplexors 627 and 629 select which two of the four bits of the second intermediate result 617 are placed into a second field 631 in the result register 625.

A control circuit 633 controls which of the subresults the multiplexors 619–621 and 627–629 select. The control circuit 633 controls the multiplexors appropriately in response to a computer multiply with select instruction. As previously described, the a particular subresults selected are based on a value stored in a select field in the computer instruction. Typically, the pair of multiplexors are controlled such that they select the same subresult from each of the intermediate results 615 and 617. For example, if multiplexor pair 619–621 selects the second subresult from the intermediate result 615 (X1*X3 intermediate result bits 2 and 3), then the multiplexor pair 627–629 will select the second subresult from the intermediate result 617 (X2*X4 intermediate result bits 2 and 3).

In the same manner as previously discussed in association with the second embodiment, instead of selecting from all possible subresults possible from intermediate results 615 and 617, simpler multiplexors can be used to select from a subset of the possible subresults. Also, this invention can be expanded to computers having registers greater than 4-bits. For example, in a 64-bit computer, operand registers 601 and 607 would each contain four 16-bit operands and the multiplier 613 would perform four 16-bit by 16-bit multiplication operations.

Figure 7:
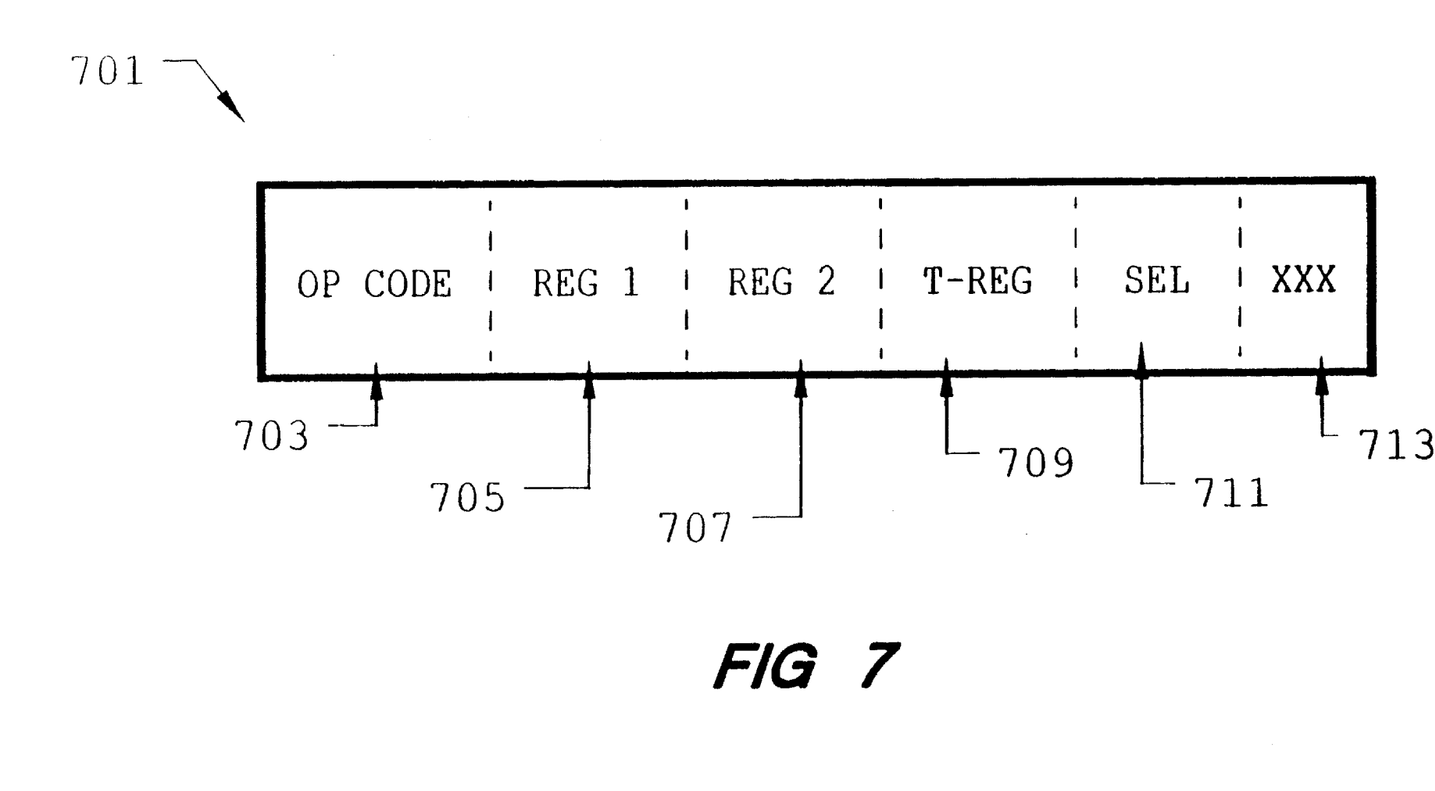
FIG. 7 illustrates a multiply with select computer instruction.

FIG. 7 illustrates a computer instruction for a multiply with select operation. The computer instruction 701 has six fields 703–713. The first field 703 is an OP-Code field that, when decoded, controls the computer to perform a multiply with select operation. As is known in the art, any predetermined value can be used as an op-code to appropriately control the computer. The second and third fields 705 and 707, respectively, contain numeric values that identify the two operand registers that contain operands to be multiplied together. The final result of the multiply with select operation is stored in a target register identified by a value in the fourth field 709.

A select field 711 contains a value which represents which subresult of the multiplication intermediate result is selected for storage in the target register. The sixth field 713 represents other information in the instruction for functions not related to this invention. As is understood by those skilled in the art, the instruction 701 format and values are necessarily optimized for a particular computer and will vary as required. In many computers, for example, it may be advantageous to split any of the six fields into multiple fields. The hardware required to decode this or any other computer instruction is well known in the art and therefore not illustrated in association with the present invention.

Figure 8:
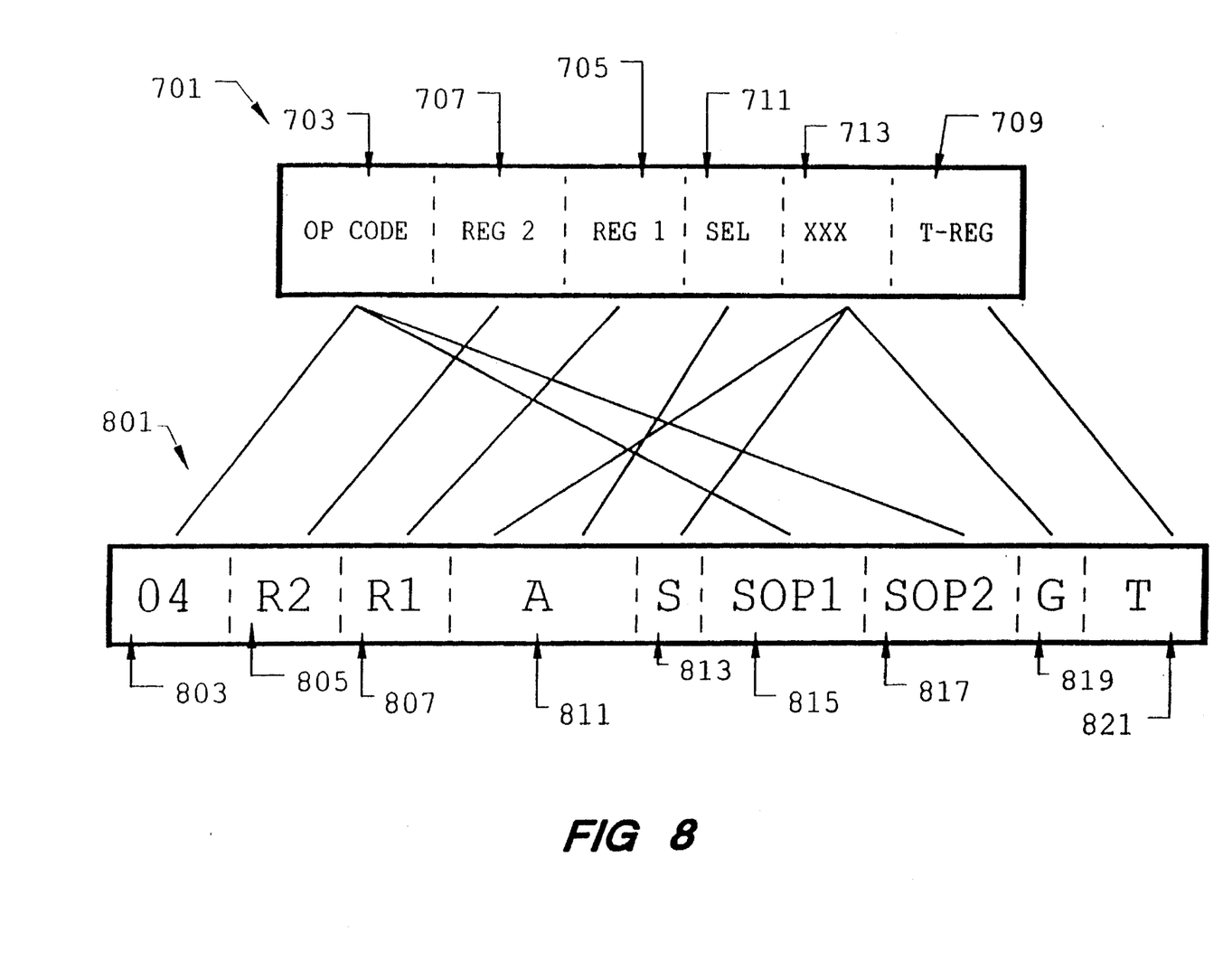
FIG. 8 illustrates a multiply and select instruction as implemented in a PA-RISC computer.

FIG. 8 illustrates the multiply with select operation 701 as implemented in the Hewlett-Packard Company Precision Risc Architecture (PA-RISC). The PA-RISC multiply with select operation instruction 801 has ten fields 803–821. Fields 803, 815 and 817 are the OP-Code fields and correspond to the OP-Code field 703 in instruction 701. Register 2 field 805 corresponds to field 707 in instruction 701. Register 1 field 807 corresponds to field 705 in instruction 701. An "A" field 811 corresponds to the select field in instruction 701. A "T" field 821 corresponds to the target register field 709 in register. Fields "S" 813 and "G" 819 are not relevant to this invention and correspond to field 713 in instruction 701. The PA-RISC instruction 801 is 32 bits wide with field 803 being 6 bits wide, fields 805, 807 and 821 being 5 bits wide and field 811 being 4 bits wide.

Three fields 803, 815 and 817 are provided in the PA-RISC instruction 801 for the OP-Code with field 803 having the value of "04". Fields 815 and 817 are sub OP-Code fields which provide additional information to the computer about the multiply operation. For example, the sub OP-Code information may indicate whether the operation is a half-word parallel multiply as described in association with the third preferred embodiment, or a full word multiply as described in association with the first preferred embodiment of the present invention.

Both the first, second and third preferred embodiments provide for a time efficient selection of multiplication subresults for storage in a result register smaller than the multiplication result. This selection is performed without additional post multiplication operations having to be performed. Also as is apparent to those skilled in the art, this invention can be advantageous applied to computers having larger registers than the examples herein. In particular, this invention is applicable to computers having 32 and 64-bit word lengths.

Also while the invention has been described utilizing multiplexors having a maximum of N+1 inputs, multiplexors having up to 2N-1 inputs can be advantageously employed. Multiplexors having more than N+1 inputs, therefore capable of selecting a subresult with fewer than N-bits, is useful for performing a multiply with select operation combined with a divide function.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computer apparatus for selection of multiplication subresults for storage in a target register, comprising:

a plurality of operand register fields having values stored therein, said operand register fields having N-bits each;

means for multiplying said values stored in said operand register fields to generate a result comprising 2N-bits;

means for storing said 2N-bit result;

multiplexor means for selecting any of said 2N-bits;

at least a first operations code (OP-Code) field containing at least a first OP-Code value for directing said computer to perform a multiply with select operation;

at least a first select field containing at least a first select field value indicating which of said 2N-bits is to be selected;

control circuit means responsive to said first OP-Code value and to said select field value for directing said multiplying means to multiply said values stored in said operand register fields and said multiplexor means to select any of said 2N-bits; and means for storing said selected bits;

wherein said stored selected bits comprise a subresult of said 2N-bit result.

2. The computer apparatus of claim 1, further comprising:

a second OP-Code field containing a second OP-Code value wherein said multiplying means is responsive to said first and second OP-Code values.

3. The computer apparatus of claim 1 wherein said computer performs a half-word parallel multiply and select operation based on said first OP-Code value.

4. The computer apparatus of claim 2 wherein
said computer performs a half-word parallel multiply and select operation based on said second OP-Code value.

5. A computer apparatus as in claim 2 wherein;
said first OP-Code field includes 6 bits;
said first operand register field includes 5 bits;
said second operand register field includes 5 bits;
said target register field includes 5 bits; and
said select field includes at least 1 bit.

6. A computer apparatus for selection of multiplication subresults for storage in a target register, comprising:
a result register comprising a plurality of fields;
a first operand register having at least a first and second fields containing N-bit values;
a second operand register having at least third and fourth fields containing N-bit values;
means for multiplying said first and said third fields together to generate a first intermediate result containing 2N-bits;
multiplexor means for selecting any of said 2N-bits of said first intermediate result for placement into a first field of said result register;
means for multiplying said second and said fourth fields together to generate a second intermediate result containing 2N-bits;
multiplexor means for selecting any of said 2N-bits of said second intermediate result for placement into a second field of said result register;
at least a first operations code (OP-Code) field containing a first OP-Code value for directing said computer to perform a multiply with select operation;
at least a first select field containing a first select field value indicating which of said 2N-bits is to be selected;
control circuit means responsive to said first OP-Code value and to said select field value for directing said multiplying means to multiply said fields and said multiplexor means to select any of said 2N-bits.

7. The computer apparatus of claim 6 further comprising:
a second OP-Code field containing a second OP-Code value wherein said multiplying and said selecting means are responsive to said first and second OP-Code values.

8. The computer apparatus of claim 7 further comprising:
a third OP-Code field containing a third OP-Code value wherein said multiplying and said selecting means are responsive to said, first, second, and third OP-Code values.

9. The computer apparatus of claim 6 wherein
said bits of said first and second intermediate results are numbered sequentially from 1 to 2N such that 1 is the most significant digit, and wherein said bits selected from said first intermediate result for placement into said first field of said result register and said bits selected from said second intermediate result for placement into said second field of said result register commence at the said numbered bit and include the same numbered bits sequential therefrom.

* * * * *